United States Patent
Varadaraj et al.

(10) Patent No.: US 6,761,818 B2
(45) Date of Patent: Jul. 13, 2004

(54) HEAVY OIL-SOLID COMPOSITION AND METHOD FOR PREPARING THE SAME

(75) Inventors: Ramesh Varadaraj, Flemington, NJ (US); James Chi Sung, Flemington, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 10/347,088

(22) Filed: Jan. 17, 2003

(65) Prior Publication Data

US 2003/0135076 A1 Jul. 17, 2003

Related U.S. Application Data

(62) Division of application No. 09/819,361, filed on Mar. 28, 2001, now Pat. No. 6,524,468.
(60) Provisional application No. 60/199,571, filed on Apr. 25, 2000.

(51) Int. Cl.[7] .......................... C10G 27/00; C10G 1/00; C07C 7/12

(52) U.S. Cl. ...................... 208/5; 208/3; 208/4; 208/39; 208/44; 585/2; 585/820; 585/823; 585/824

(58) Field of Search ............................. 208/5, 3, 4, 39, 208/44; 585/2, 820, 823, 824

(56) References Cited

U.S. PATENT DOCUMENTS 4,344,841 A * 8/1982 Johnson et al. ............. 208/211
6,524,468 B2 * 2/2003 Varadaraj et al. ............... 208/5

FOREIGN PATENT DOCUMENTS

EP          0422315      4/1991      ........... C08L/95/00

* cited by examiner

*Primary Examiner*—Walter D. Griffin
*Assistant Examiner*—Tam M. Nguyen
(74) *Attorney, Agent, or Firm*—Ramesh Varadaraj; Estelle C. Bakun

(57) ABSTRACT

The invention includes a compositon of matter comprising a heavy oil having dispersed therein surface modified solid wherein said surface modified solids comprise solids having adsorbed thereon air oxidized polar hydrocarbons from said heavy oil and wherein said surface modified solids have a diameter of about 10 microns or less and a method for preparing the same.

13 Claims, 3 Drawing Sheets

HEAVY OIL-SOLID COMPOSITION AND METHOD FOR PREPARING THE SAME

This application is a Divisional of U.S. Ser. No. 09/819,361 filed Mar. 28, 2001, now U.S. Pat. No. 6,524,468 based on Provisional U.S. Serial No. 60/199,571 filed Apr. 25, 2000.

FIELD OF THE INVENTION

The invention is directed to a composition of matter having improved viscoelastic properties and a method for preparing the same.

BACKGROUND OF THE INVENTION

Refineries are faced with the task of upgrading heavy oils such as resid or bitumen which is an expensive undertaking, or finding a use for it. One use for the heavy oil is in the preparation of asphalts and roofing tiles. Currently, methods for improving the properties of heavy oils utilized for asphalts and roofing tiles include air blowing and polymer modification. What is needed in the art are ways of economically utilizing heavy oils and for affording materials with improved properties for use in items which typically employ heavy oils, such as asphalts and roofing tiles.

SUMMARY OF THE INVENTION

Figure 1:
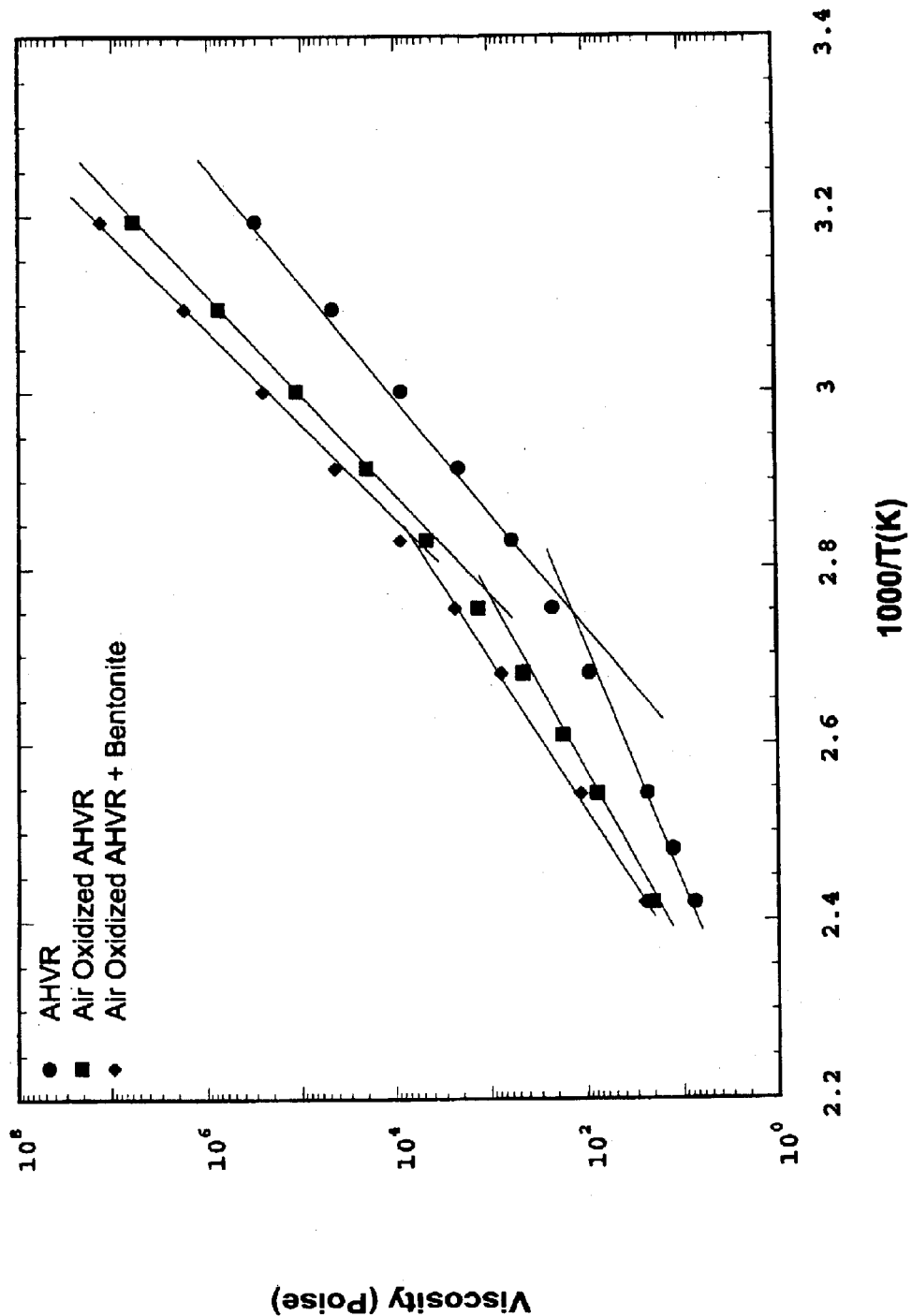
FIG. 1 depicts Viscosity in poise (Y-axis) VERSUS 1000/temperature (K) for Arab Heavy Vacuum Resid, air oxidized Arab Heavy Vacuum Resid and air oxidized Arab Heavy Vacuum Resid with bentonite solids.

The invention includes a composition of matter comprising a heavy oil having dispersed therein surface modified solids wherein said surface modified solids comprise solids having adsorbed thereon air oxidized polar hydrocarbons from said heavy oil.

The invention also includes a method of producing a composition of matter said method comprising thermally treating a mixture of heavy oil and solids having wherein said solids have a total surface area of about 1500 square microns or less in the presence of oxygen for a time and at a temperature sufficient to produce oxidized polars from said heavy oil and to allow said oxidized polars to adsorb onto the surface of said solids wherein said adsorption achieves at least 50% coverage.

The invention also includes a product prepared by the process described above.

DETAILED DESCRIPTION OF THE INVENTION

The invention provides for a composition of matter comprising a heavy oil and solid and a method for preparing the same. As used herein, a heavy oil is an oil having an API gravity of less than or equal to 20.

The method includes the step of thermally treating a mixture of heavy oil and solids for a time and at a temperature sufficient to produce oxidized polars from said heavy oil and to allow said oxidized polars to adsorb to the surface of said solids. Preferably, the solids and heavy oil will be mixed prior to and during the thermal treatment. Typically, the temperature will range from about 120 to about 220° C., preferably about 130 to about 180° C. The time may range from about 15 minutes to about 6 hours, preferably from about 3 to about 5 hours. During the thermal treatment, the mixture is purged with an oxygen source which may be oxygen, air or any other oxygen-containing source. Typically, the air or oxygen purged will be conducted at a rate of about 20 to about 150 scfs/barrel, preferably about 60 to 100 scfs/barrel of heavy oil.

The solids may be selected from a variety of materials including inorganic and organic solids. For example, inorganic solids may include fumed silica, sold under the trade name of Aerosil 130, bentonite clays, divided or delaminated bentonite clay gel, kaolinite clays, and mixtures thereof. The organic solids may include, for example carbanaceous solids such as soot and coke fines, or mixtures thereof. The solids, if spherical are preferably in the size range of about 20 microns or less in diameter, more preferably less than 10 micron, even more preferably less than 5 microns, and most preferably about 2 micron or less, more specifically 100 nanometers or less. The solids, if non-spherical or spherical, preferably have a total surface area of about 1500 square microns or less. The preferred treat rate for the solids is 0.05 to 20.0 wt %, based on the weight of the oil, more preferably, 0.1 to 2.0 wt %. The preferred materials are clays, specifically montmorillonite clays such as bentonite. Preferably, the clays will be a gel comprising delaminated or divided sheets of clay. The solid particles must also remain dispersed or undissolved in the oil. It is preferred that the solid particles are hydrophilic solids. The hydrophilicity of the solids can be determined by water wettability methods known in the art.

The solids utilized herein may exhibit a tendency to clump or aggregate prior to thermal treatment. The phenomena of aggregation is known in the art and its origin is attributed to primarily weak physical attraction forces. The size of the solids herein is the size of the individual isolated solid particle and not that of the aggregate. During the thermal treatment, the mixture of solids and heavy oil is mixed at elevated temperatures. The shearing forces accompanying the mixing at elevated temperatures are sufficient to de-aggregate the solids. If the solids are added post thermal treatment the mixture is subjected to high shear mixing preferably in the range of 7000 to 12000 rpm of the mixing paddle. It is preferred to add the solids prior to thermal treatment. Regardless of whether or not the solids utilized herein aggregate, the composition produced will exhibit improved viscoelastic properties.

The compositions of the current invention exhibit unique rheological properties. The viscosity of the compositions are higher than either the heavy oil itself or thermally air oxidized heavy oil having no solids added thereto. They exhibit shear thinning (non-Newtonian) behavior at low temperatures and the transition from non-Newtonian to Newtonian behavior occurs at about 80 to 100° C. Further, these compositions are strongly viscoelastic in the temperature range of 40° C. to 150° C. as revealed by the experimentally determined viscous and elastic modulus profiles. Increased enthalpy of melting observed for the composition compared to the untreated heavy oil or air oxidized heavy oil indicates an improved thermoplastic property. The compositions of this invention have potential uses in applications where thermoplasticity and viscoelasticity of the heavy oil is a key property influencing performance eg., asphalt for roads and roofing tiles. The extent of improvement for the compositions will depend on the heavy oil and solid mixture utilized.

The heavy oil used to prepare the composition of the current invention can be oil of any type or composition, including but not limited to crude oil, refined oil, oil blends, chemically treated oils, resids, thermally treated oils, bitumen and mixtures thereof. Preferably, the oil should contain a sufficient amount (at least about 0.5 wt % to about 40 wt %, preferably at least about 0.5 to about 13 wt %) of asphaltenes, polar hydrocarbons, or polar resins to enhance the solid-particle-oil interaction. Crude oil residuum that is obtained from the atmospheric pipestill or vacuum pipestill of a petroleum refinery is best suited for the invention. Heavy hydrocarbons like bitumen are also useful in preparing the compositions herein described.

Treating the mixture of oil and solid particles in the presence of a source of oxygen causes various reactions to occur in the oil and on the surface of the solid particles. The aromatic components of the oil that have benzyllic carbons and those that have fused rings that are oxidizable including, but not limited to naphthalene and anthracene, are oxidized to the corresponding acids, ketones or quinine products. Organo sulfur and nitrogen compounds present are oxidized to sulfoxides and nitrogen oxides. The oxygenated compounds are more surface-active than the aromatic components themselves and absorb strongly on the surface of the solid particles to improve the physical properties of the composition. If naphthenic acids are present as salts of divalent cations like calcium, air oxidation can convert these salts to naphthenic acids and the corresponding metal oxide, for example calcium oxide. The free naphthenic acid can adsorb on the surface of the solids and also improve the physical properties of the composition. Thermal treatment with an oxygen source purge dehydrates the solid particles and thus modifies the solids' surface to improve its interaction with the surface-active components of oil (preexistent in the oil or generated from air oxidation). The solid particles may be added before, during or after the thermal air oxidation step. However, it is preferred to add the solids to the oil and then oxidize the mixture.

If bentonite is used as the solid particle, it may be used in divided or delaminated form as a gel. When the gel is added to the oil and subjected to the thermal treatment in the presence of an oxygen source, for example, air or oxygen, water is expelled from the reaction vessel as steam.

The thermal treatment reaction should be carried out until at least 80% of the water present in the mixture is expelled, preferably until 95% of the water is expelled, and even more preferably until 99% of the water is expelled.

The amount of solid particle added to the oil can vary in the range of about 1% to 30% based on the weight of the oil. At the higher concentrations, the mixture of solids and heavy oil will be a high solids content slurry. When divided bentonite gel is used as the carrier for the bentonite solid, the amount of gel added to the oil before oxidation can vary in the range of 5 to 95% of gel based on the weight of the oil. The weight of bentonite clay solids in the gel can vary from 1 to 30% based on the weight of the water. Bentonite clay gel can easily be prepared by delamination or peptization methods known in the art. An Introduction to Clay Colloid Chemistry by H. van Olphen second Edition John Wiley & Sons provides a description of peptizing and delamination methods practiced in the art.

Catalysts may be used to enhance the oxidation reaction. The oxidation catalyst may be selected from catalysts containing iron, nickel, manganese, and mixtures thereof. The catalyst can be added to the thermal treatment as finely divided metal or oil soluble metal salts such as iron naphthenate and can be used to catalyze oxidation rates and effect selectivity in the oxidation products. Such oxidation promoting catalysts and the techniques of using such catalysts are well known in the art. Oxidation can be conducted at elevated pressures of about 30 to about 100 psi to further catalyze the reaction rate and achieve product selectivity, however, oxidation at ambient pressures is preferred.

The following examples are illustrative and are not meant to be limiting in any way.

EXAMPLE-1

In a typical experiment, 200 g of a mixture of Arab Heavy vacuum resid (AHVR) & 5 g Aerosil 130 (product of Degussa Corp) silica was placed in a Parr autoclave or three-necked glass flasks and oxidized at temperatures of 150 to 180° C. for 2 to 6 hours with a continuous purge of air at 80 to 100 scf/bbl/hour. After completion of reaction a product comprising the resid-silica composition is obtained.

EXAMPLE-2

Arab Heavy vacuum resid and bentonite gel is first mixed to form slurry. Air or oxygen gas is purged into the reactor at 80 to 100 scf/bbl/hour and the temperature raised to between 150° C. and 170° C. The water is expelled as steam and can be condensed outside for recovery and reuse. The temperature is maintained between 150° C. and 170° C. for 4 to 6 hours.

A mixture of 200 grams (g) Arab Heavy vacuum resid and 20 g of divided bentonite gel (providing an oil to gel ratio of 10:1, and with a bentonite solids concentration of 3.5 wt % in the gel) was heated to a temperature of 160° C. for 4 hours with an air purge of 80 scf/bbl/hour. About 19.6 g of water was expelled from the reactor. After completion of reaction the product was tapped hot from the reactor.

EXAMPLE-3

A mixture of 100 grams (g) Arab Heavy vacuum resid and 30 g of divided bentonite gel (providing an oil to gel ratio of 10:3, and with a bentonite solids concentration of 3.5 wt % in the gel) was heated to a temperature of 160° C. for 4 hours with an air purge of 80 scf/bbl/hour. About 29 g of water was expelled from the reactor. After completion of reaction the product was tapped hot from the reactor.

EXAMPLE-4

Comparative Example—Air Oxidized Resid without Solids 200 g of Arab Heavy vacuum resid was placed in a three-necked glass flask and heated to a temperature of 150 to 180° C. for 4 hours with a continuous purge of air at 80 to 100 scf/bbl/hour. After completion of reaction the product was tapped hot from the reactor.

Products from examples 1–4 and the untreated resid were subjected to the following analyses:
 a) Chemical analyses
  ATRA scan analyses-silica micro column chromatography;
  $^{13}$ Nuclear Magnetic Resonance
  ourier Transform Infrared (FTIR)
 b) Viscosity as a function of shear rate
 c) Viscosity as a function of temperature d) Viscoelasticity to determine the elastic modulus and viscous modulus Results from the IATRA scan chromatography analyses of the resid before and after thermal treatment confirmed that the thermal treatment process converts about 15% of the aromatic fraction into oxidized compounds. Furthermore, 24% of the heaviest fraction of the resid (or asphaltene like polars) is also converted to lower molecular weight oxidized compounds. $C^{13}$NMR and FTIR identified the oxidized compounds as ketones, carboxylic acids, anhydrides and aldehydes.

Viscosity as a function of shear rate profiles for the untreated Arab Heavy Vacuum resid, air-oxidized resid and one possible resid-clay composition of the invention at 0.4 wt % bentonite were determined. The resid-clay composition exhibited a higher viscosity than the resid or air oxidized resid at any given temperature and shear rate in the 40 to 140° C. temperature and $10^{-5}$ to $10^2$ shear rate ranges. At lower temperatures the resid-clay composition exhibited shear thinning or non-Newtonian viscosity behavior. The temperature at which the composition transitions from shear thinning to shear independent viscosity is higher (80° C.) for the resid-clay composition. This result is indicative of stronger network microstructure for the resid-clay composition compared to the resid or air oxidized resid.

Viscosity as a function of 1/temperature plots for the resid, air oxidized resid and resid-clay composition are shown in FIG. 1.

Treating viscosity analogous to a rate process & fitting the data to the Andrade-Eyring equation (simple Arrhenius behavior) two processes are recognized (a slow and a fast process) with different slopes or energies of activation. For the resid-clay composition the energies of activation are higher and transition from the fast to slow process occurs at a lower temperature. This observation suggests a difference in network microstructure for the resid-clay composition compared to the resid or air oxidized resid.

Treating viscosity as a function of 1/temperature plots according to free volume & glass transition theory and using the Williams-Landel-Ferry equation one can obtain the glass transition temperature ($T_g$), free volume fraction at glass transition ($f_g = V_f/V$) and difference in coefficients of thermal expansion below and above the glass transition point ($\alpha$). Results for the resid, air oxidized resid and resid-clay composition are given Table 1. The resid-clay composition exhibits a lower $f_g$ and lower $\alpha$ compared to the resid or air oxidized resid. $\alpha^{-1}$ is a measure of activation energy, smaller $\alpha$ for the resid-clay composition indicates larger activation energy for the composition. These results suggest a stronger network microstructure for the resid-clay composition compared to the resid or air oxidized resid.

Figure 2:
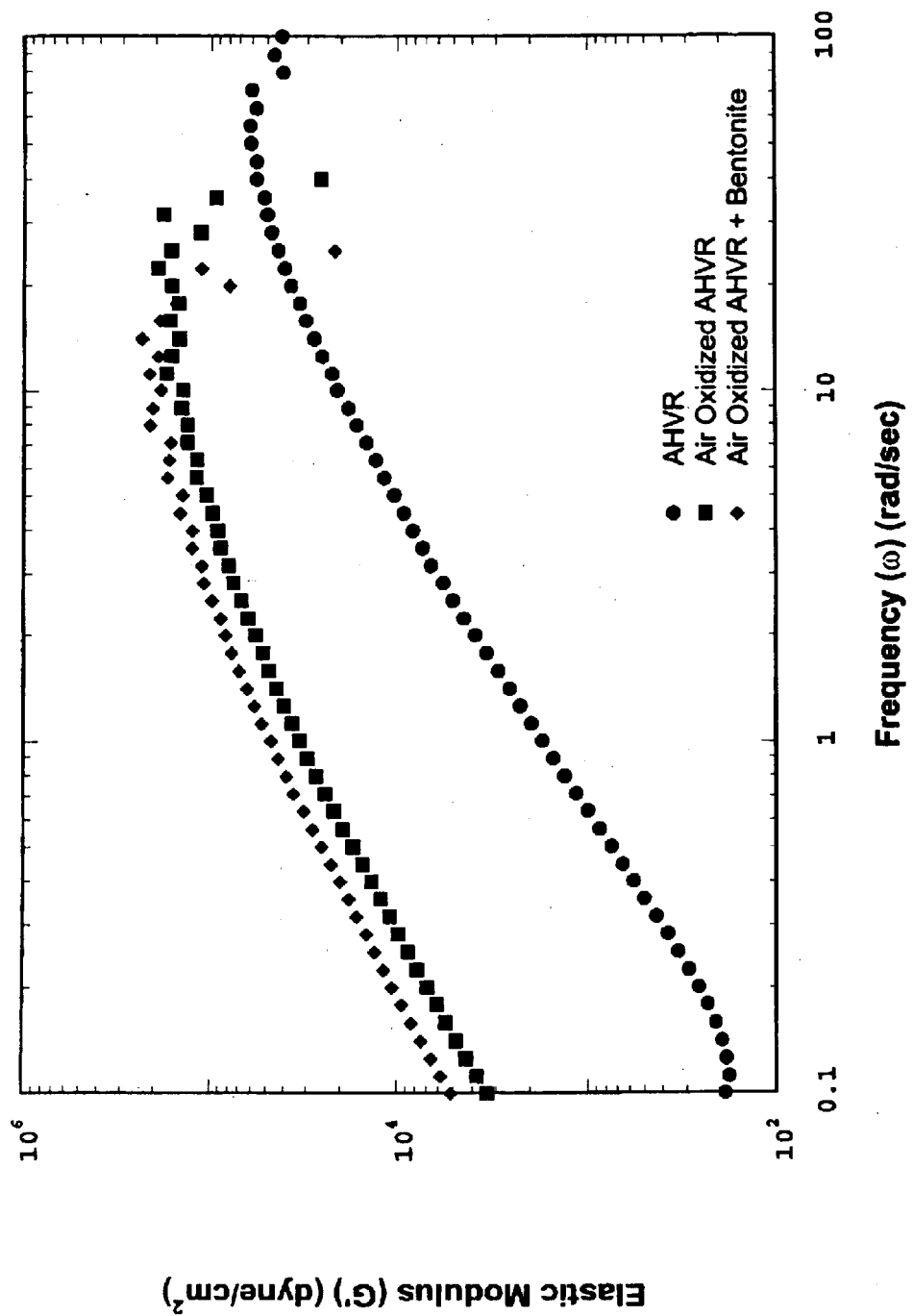
FIG. 2 depicts the elastic modulus (Y-axis) in dyne/cm$^2$, versus frequency (X-axis) for Arab Heavy Vacuum Resid, air oxidized Arab Heavy Vacuum Resid and air oxidized Arab Heavy Vacuum Resid with bentonite solids.
Figure 3:
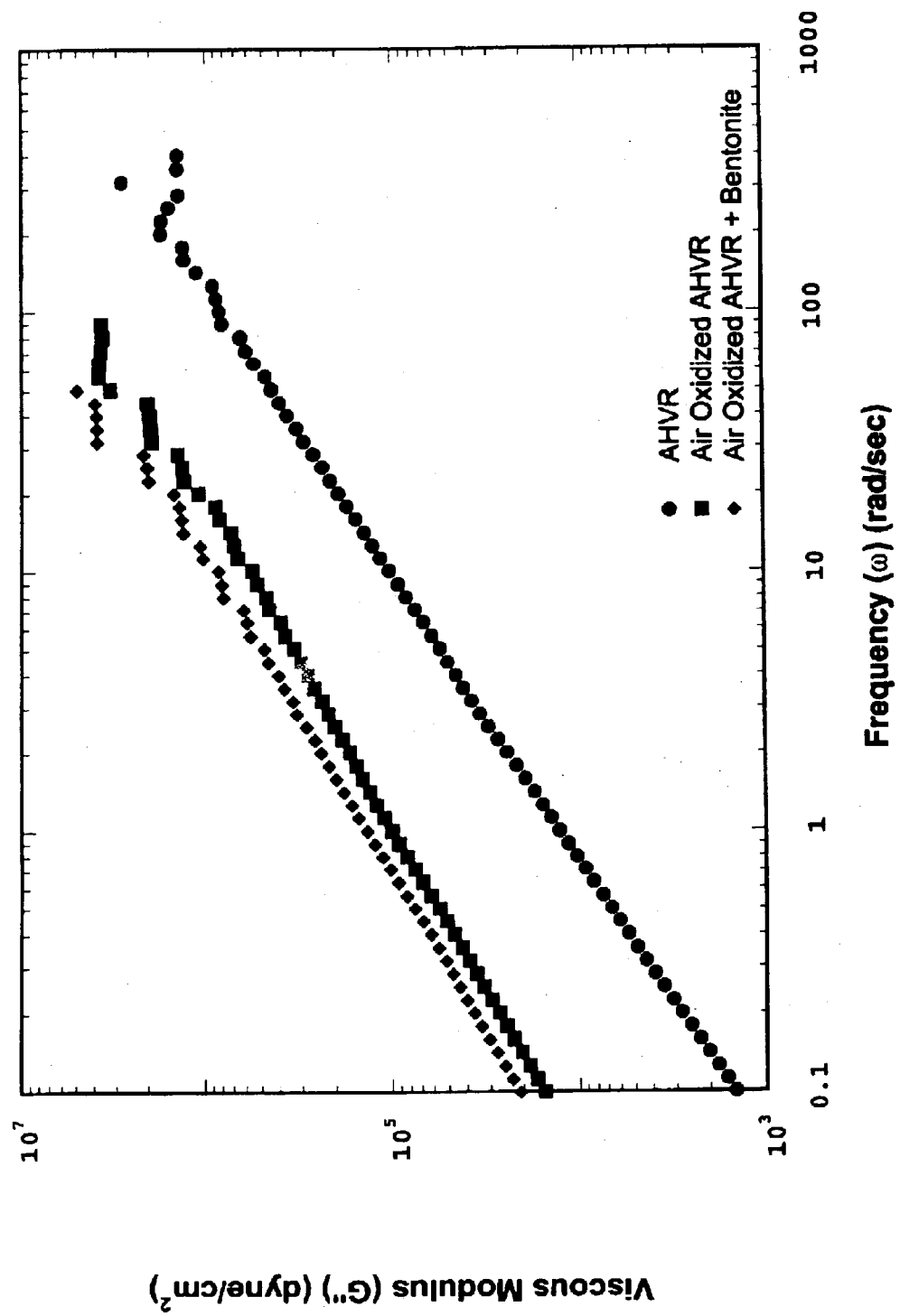
FIG. 3 depicts viscous modulus (dyne/cm$^2$) Y-axis, versus Frequency (X-axis) for Arab Heavy Vacuum Resid, air oxidized Arab Heavy Vacuum Resid and air oxidized Arab Heavy Vacuum Resid with bentonite solids.

Viscoelastic properties of compositions are expressed in terms of loss modulus (G") and storage modulus (G'). G" and G' represent the viscous and elastic components of the response of the material to an applied strain. A Rheometric Scientific Rheometer was used to determine G' and G" in the oscillatory mode. G' and G" as a function of frequency sweep were determined for a fixed sinusoidal oscillation in the 40 to 140° C. temperature range. G' and G" at 60° C. for resid, air oxidized resid and resid-clay compositions (at 0.4 wt % bentonite) are given in FIGS. 2 and 3 respectively. An increase in the elastic modulus and viscous modulus occur due to air oxidation. Air oxidation with bentonite results in a further increase in the elastic and viscous modulus.

TABLE 1

|  | AHVR | Air Oxidized AHVR | Air Oxidized AHVR + Bentonite |
|---|---|---|---|
| $f_g(V_f/V) =$ | $2.6767 \times 10^{-2}$ | $2.6017 \times 10^{-2}$ | $2.3867 \times 10^{-2}$ |
| $\alpha(K^{-1}) =$ | $4.1465 \times 10^{-4}$ | $3.5195 \times 10^{-4}$ | $2.524 \times 10^{-4}$ |
| $T_g(° C.) =$ | $-3.1664$ | $6.7413$ | $5.7428$ |

$f_g(V_f/V)$ free volume fraction at $T_g$
$\alpha(K^{-1})$ difference in coefficient of thermal expansion above and below the $T_g$
$T_g(° C.)$ glass transition temperature

What is claimed is:

1. A method of producing a composition of matter said method comprising thermally treating a mixture of heavy oil and solids, wherein each of said solids has a total surface area of about 1500 square microns or less, in the presence of oxygen for a time and at a temperature sufficient to produce oxidized polars from said heavy oil and to allow said oxidized polars to adsorb onto the surface of said solids wherein said adsorption achieves at least 50% coverage.

2. The method of claim 1, wherein said thermal treatment is conducted at a temperature of about 120° C. to about 220° C.

3. The method of claim 1, wherein said thermal is conducted in the presence of an oxidation catalyst.

4. The method of claim 3 wherein said oxidation catalyst is selected from a catalyst containing iron, manganese, nickel or mixtures thereof.

5. The method of claim 1, wherein said solid particles are present in said mixture in the range of about 0.05 to 20 wt % based on the weight of oil.

6. The method of claim 1 wherein about 1 to about 30 wt % solids are present based on the weight of said oil.

7. The method of claim 1 wherein the solids are added to the oil as a gel or slurry.

8. The method of claim 7 wherein said gel comprises about 1 to about 10 wt % clay solids and about 90 to about 99 wt % water.

9. The method of claim 7 wherein said gel is in the range of 5 to 95% of gel based on the weight of said oil.

10. The method of claim 1 wherein said solid particles are selected from inorganic and organic solids selected fern the group consisting of fumed silica, bentonite clays, bentonite clay gel, divided or delaminated bentonite clay gel, kaolinite clays, coke fines soot and mixtures thereof.

11. The method of claim 1 wherein said heavy oil is selected from the group consisting of crude oil, thermally treated oil, chemically tested oil, crude oil residuum, bitumen, or mixtures thereof.

12. The method of claim 1 wherein said solids are spherical or non spherical.

13. The method of claim 11 wherein said solids are spherical they have an individual isolated particle diameter of about 20 microns or less.

* * * * *